(12) United States Patent
Schirle et al.

(10) Patent No.: US 10,145,456 B2
(45) Date of Patent: Dec. 4, 2018

(54) HYDRODYNAMIC CONVERTER AND ADJUSTMENT DEVICE FOR A CONVERTER OF THIS TYPE

(71) Applicant: VOITH PATENT GMBH, Heidenheim (DE)

(72) Inventors: Hans Schirle, Stimpfach (DE); Hartmut Graf, Urbach (DE)

(73) Assignee: Voith Patent GmbH, Heidenheim (DE)

( * ) Notice: Subject to any disclaimer, the term of this patent is extended or adjusted under 35 U.S.C. 154(b) by 299 days.

(21) Appl. No.: 15/036,826

(22) PCT Filed: Oct. 16, 2014

(86) PCT No.: PCT/EP2014/072178
§ 371 (c)(1),
(2) Date: May 16, 2016

(87) PCT Pub. No.: WO2015/071042
PCT Pub. Date: May 21, 2015

(65) Prior Publication Data
US 2016/0290460 A1 Oct. 6, 2016

(30) Foreign Application Priority Data

Nov. 14, 2013 (DE) .......................... 10 2013 223 203
Jul. 15, 2014 (DE) .......................... 10 2014 213 726

(51) Int. Cl.
*F16D 33/02* (2006.01)
*F16H 41/26* (2006.01)
*F16H 61/56* (2006.01)

(52) U.S. Cl.
CPC ............. *F16H 41/26* (2013.01); *F16H 61/56* (2013.01)

(58) Field of Classification Search
CPC ........................................................ F16H 61/56
USPC ............................................................ 60/354
See application file for complete search history.

(56) References Cited

U.S. PATENT DOCUMENTS 2,935,898 A 5/1960 Ahlen
2,995,955 A 8/1961 Kelley
3,151,457 A 10/1964 Jandasek
3,330,112 A 7/1967 Denes et al.

FOREIGN PATENT DOCUMENTS

CN 2168127 Y 6/1994
FR 1248173 A 12/1960

*Primary Examiner* — Michael Leslie
(74) *Attorney, Agent, or Firm* — Laurence A. Greenberg; Werner H. Stemer; Ralph E. Locher (57) ABSTRACT

A hydrodynamic converter has a working chamber through which an operating medium can flow. A pump wheel is connected to a drive shaft and a turbine wheel is connected to a driven shaft. At least one positioning blade can be adjusted by an adjustment device. In order to provide a compactly formed and robust hydrodynamic converter of this type, having a hard-wearing adjustment device for adjusting at least one positioning vane, the adjustment device includes an actuating drive with ring elements. Each ring element is disposed coaxially in relation to the drive shaft. A first ring element is connected to the at least one positioning blade for transmitting a positioning force or a positioning torque via a diverting device. The first ring element can be rotated relative to a second ring element in the circumferential direction of the drive shaft.

23 Claims, 3 Drawing Sheets

HYDRODYNAMIC CONVERTER AND ADJUSTMENT DEVICE FOR A CONVERTER OF THIS TYPE

BACKGROUND OF THE INVENTION

Field of the Invention

The present invention relates to a hydrodynamic converter having the features of the preamble of claim 1 and to an adjustment device for a converter of this type. A converter of the type in question is known from U.S. Pat. No. 3,151,457, for example.

Hydrodynamic converters or torque converters have at least three blade wheels, i.e. a pump wheel, a turbine wheel and a stator, which deflect a flow circulating in a working space. This basic construction is referred to as single-stage. If the converter has a device which enables the circulatory flow to be changed during operation, this is a variable converter. One example of a converter of this type is the adjustable converter, the blades of which can be adjusted from outside during operation.

The pump wheel, which is coupled to the drive, transmits the pump wheel torque produced by the drive to the operating medium flowing in the working space. The operating medium transmits the torque to the turbine wheel, which is coupled to the output. In addition, a deflection of the operating medium is produced by the stator, which is in the working space and is firmly connected to the housing, and by the guide blades thereof. Through the deflection of the operating medium at the guide blades, the torque output to the turbine wheel by the operating medium is intensified. Thus, the output torque can be up to 2.5 to 12 times the input torque, for example.

Converters with rigid blades have a single operating state, in which an optimum incident flow direction for the blades of all the wheels is specified. If there are deviations from this operating state, there are not only frictional losses but additional flow losses, which are all the greater, the greater the deviations from the optimum operating state. For this reason, adjustable stator and/or pump-wheel blades are installed.

The prior art includes hydrodynamic converters which allow adjustment of the pump wheel blades.

U.S. Pat. No. 3,330,112 shows a torque converter, the pump blades of which are pivotably mounted. The angle of attack of the blades can be changed by means of a deflection device. For this purpose, the pump blades are each connected to a common adjusting ring by a joint, thus allowing the angle of attack of the pump blades to be set by means of a rotary motion of the adjusting ring relative to the pump wheel. The adjusting ring is coupled mechanically, by means of toothing, to a subsection that can be moved in the axial direction of the drive shaft, thereby making it possible to produce the desired relative rotary motion of the adjusting ring. The translational movement of the subsection is controlled by two mutually separate pressure chambers.

U.S. Pat. No. 3,151,457 discloses a converter, wherein a subregion of the blade of the pump wheel can be set by means of a deflection device. For this purpose, a cylinder is supplied with hydraulic fluid via a pressure channel, which is passed into the interior of the pump wheel. By means of a stroke motion of the cylinder piston, the cylinder turns an adjusting ring. By means of the turning of the adjusting ring, the desired change in the angle of the pump wheel blades is produced.

The required pressure must be built up over a relatively long distance via the pressure channel. Moreover, appropriate sealing of the pressure channel must be ensured in the rotating components of the converter in order to sustain a change in the angle of the subregion of the pump wheel blades over a prolonged period in the operating state of the converter.

BRIEF SUMMARY OF THE INVENTION

Given this background situation, it is the object of the invention to specify a hydrodynamic converter which is of compact construction, is robust and has a low-wear adjustment device for adjusting at least one adjustable blade. It is furthermore the underlying object of the invention to specify an adjustment device for a hydrodynamic converter.

According to the invention, the invention is achieved, in respect of the hydrodynamic converter, by the subject matter as claimed and, with respect to the adjustment device, by the subject matter as claimed.

Thus, the invention is based on specifying a hydrodynamic converter which has a working space, through which an operating medium can flow. The converter comprises a pump wheel, which is connected to a drive shaft, a turbine wheel, which is connected to a driven shaft, and a stator. The converter according to the invention is a "variable converter", which has at least one adjustable blade, which can be adjusted by means of an adjustment device. The converter according to the invention is characterized in that the adjustment device has an actuator having ring elements, which are each arranged coaxially with respect to the drive shaft. In this case, a first ring element is connected to the at least one adjustable blade at least indirectly, i.e. directly or via further transmission devices, by means of a deflection device for the transmission of an actuating force or an actuating torque. The first ring element can be turned relative to a second ring element in the circumferential direction of the drive shaft.

"At least indirectly" means directly or indirectly with the interposition of further transmission elements.

The invention has the advantage that only a few mechanical components that are subject to wear are required to produce an actuating force or an actuating torque. In general, this is achieved by virtue of the fact that production, introduction and transmission of the force are accomplished substantially by rotary movements of the adjustment device.

To be specific, this is achieved in the invention by virtue of the fact that ring elements are provided, which form the actuator and can be turned relative to one another in the circumferential direction of the drive shaft. The first ring element is coupled to the adjustable blade by the deflection device. The actuating torque or actuating force produced by the rotation of the first ring element relative to the second ring element is introduced into the adjustable blade by the deflection device and holds the latter in the desired position.

The ring elements are each arranged coaxially with respect to the drive shaft, leading to a compact construction of the actuator.

The first ring element can preferably be turned hydraulically.

According to a first embodiment, the actuator and the deflection device are formed by separate devices. In a particularly advantageous embodiment, these can be arranged in a space-saving manner in one axial plane with an offset in the radial direction relative to one another. An alternative embodiment consists in arrangement with an offset in the axial direction, free from an offset in the radial direction or with an offset.

In an advantageous development, the deflection device is formed by the actuator. This solution offers the advantage of an arrangement that is particularly space-saving and of a low outlay on construction.

The embodiment in which the adjustable blade is a pump blade is particularly preferred. The adjustable blade forms part of the blade ring of the pump wheel. Here, a single adjustable blade of the blade ring can be adjustable, or a plurality, in particular all, of the blades of the blade ring can be adjustable. The adjustable pump blade brings about a change in the flow angle of the operating medium flowing in the working space and restricts the volume flow. It is thereby possible to change the pump torque output in the working space. In terms of flow, this has the advantage that the pump torque changes greatly because the outlet and inlet radius approach one another in the case of an increased pitch of the pump blades. Moreover, the circumferential component of the flow velocity is reduced. The power input can be influenced in a specifically intended way, in particular controlled, by means of the adjustment of blades or blade components of the pump wheel.

The adjustment device is preferably suitable for hydrodynamic counterrotating converters, in particular single-stage counter-rotating converters in combination with adjustment of the blading on the pump wheel. This offers the advantage of particularly simple incorporation of the adjustment device in terms of construction owing to the good accessibility to the pump wheel entailed by the construction. Other types of converter can likewise be fitted with the adjustment device.

The coaxial arrangement of the ring elements with respect to the drive shaft allows a simple and compact construction of the adjustment device and thus of the converter, thereby reducing both the outlay in terms of construction and the risk of wear.

In a preferred embodiment, the second ring element is connected for conjoint rotation to the drive shaft and takes the first ring element along during a rotation of the drive shaft. This embodiment is suitable particularly for adjustment of the pump blade because the ring elements rotate at the same speed as the pump wheel. The position of the adjustable blade is influenced by setting the angular position of the first and the second ring element relative to one another. Since the two ring elements rotate with the drive shaft, there is a relative motion between the components only during the adjustment process. Before and after the adjustment process, there is no relative motion between the drive shaft, the ring elements and the pump wheel, with the result that the abovementioned elements together form a rotating unit.

In another preferred embodiment, the first and the second ring element form at least two pressure chambers, which are arranged in the circumferential direction of the drive shaft and can each be subjected to pressure for the relative rotation between the first and second ring element. The first ring element is actuated hydraulically. Mechanical actuating elements, e.g. return springs, are thus avoided. The return or, in general terms, the change in position of the first ring element is accomplished hydraulically. By means of the two pressure chambers, the change in position can be performed in both circumferential directions.

By setting suitable pressures in the pressure chambers, it is possible to hold an angular position of the two ring elements and thus a desired angle of attack of the adjustable blade. Another advantage of this embodiment is the infinitely variable adjustability of the adjustable blade.

The first ring element can form a cylindrical housing, in which the second ring element is arranged. A particularly compact embodiment of the actuator is thereby achieved.

The first and the second ring element preferably each have radially extending vanes, which are arranged mirror-image fashion and delimit the pressure chambers in the circumferential direction. Here, the vanes arranged mirror-image fashion engage in one another and can be spaced apart in the circumferential direction in such a way that pressure chambers with a variable volume are formed. By subjecting the pressure chambers to different pressures, the first ring element is rotated clockwise or counterclockwise relative to the second ring element. Adjustment of the adjustable blade in different directions is thereby possible.

The vanes can have radially arranged sealing devices and/or axial sealing devices to seal off the pressure chambers. The sealing devices comprise at least one sealing element or can also be embodied as contactless sealing devices.

In a preferred embodiment, the pressure chambers have stops for limiting the relative rotation between the first and the second ring element, said stops being arranged in the circumferential direction of the drive shaft. The stops thus define the travel of the first ring element in the circumferential direction. The stops can be of replaceable design, with the result that, on the one hand, the stops can be replaced in the event of wear and, on the other hand, the travel or actuating path of the first ring element can be adjusted.

In general terms, the first ring element can be understood as a rotating cylinder, the travel of which acts in the circumferential direction.

Bores are preferably formed in at least one ring element, in particular in the second ring element, said bores opening into the pressure chambers, in particular in the region of the outside diameter, for the application of pressure. The formation of the bores in the second ring element has the advantage that the feed channels can be formed in the drive shaft, being fluidically connected to the bores formed in the second ring element. The opening of the bores in the region of the outside diameter of the second ring element has the advantage that scavenging of the pressure chambers is thereby achieved. Any contaminants adhering to the outside diameter, which accumulate there during operation, are removed or avoided through the introduction of the working medium in the region of the outside diameter.

In a particularly preferred embodiment, the deflection device has an adjusting ring, which is arranged coaxially with respect to the drive shaft and is connected for conjoint rotation to the first ring element. The adjusting ring is coupled to the at least one adjustable blade for the transmission of an actuating force or of an actuating torque. The adjusting ring contributes to the compact construction of the converter since, like the ring elements, it is arranged coaxially with respect to the drive shaft. By virtue of the connection of the adjusting ring for conjoint rotation to the first ring element, any mechanical coupling components are avoided. On the contrary, the actuating torque required for the adjustment of the adjustable blade is introduced into the adjusting ring directly by the first ring element. The connection for conjoint rotation between the adjusting ring and the ring element can be achieved by means of a material joint, such as a welded joint, or by means of positive or nonpositive joints, for example.

In another embodiment, the coupling of the adjusting ring to the adjustable blade can be accomplished by virtue of the fact that the adjusting ring has at least one cam, which interacts with a crank mechanism. The crank mechanism is coupled to the adjustable blade. Control of the adjustable blade by a crank mechanism is known per se, and therefore reference can be made in this regard to already existing designs. As compared with the prior art, the formation of the cam on the adjusting ring has the advantage that no special mechanical components are required to introduce force into the crank mechanism. On the contrary, the crank mechanism is actuated directly by the cam. The return force is produced by the torque in the working space, which is applied to the adjustable blade. The crank mechanism preferably forms a radially arranged lever element, which converts the rotary motion of the adjusting ring into a translational motion. By virtue of the coupling of the lever element to the adjustable blade, the actuating movement is achieved in a manner known per se.

In an alternative embodiment, the adjusting ring has external toothing, which meshes with the external toothing of a journal of the adjustable blade. The journal extends parallel to the central axis of the adjusting ring. This embodiment has the advantage that the rotary motion of the adjusting ring is converted directly into a pivoting motion of the adjustable blade. The number of mechanical components is thereby further reduced.

The adjustable blade can comprise a pivoted blade or a multi-element blade having at least one pivoted segment. Pivoted blades and multi-element blades are known per se, wherein a pivoted blade signifies a one-piece adjustable blade which can be adjusted as a whole. In the case of a multi-element blade, one blade segment is fixed. At least one further blade segment is pivotable. The drive for the pivotable blade segment is provided by the adjustment device.

The pivotable blades or adjustable blade segments are pivotably mounted blades or blade parts, the angular position of which relative to an initial position that can be described by the extent in the radial direction can be varied by turning about a defined pivoting axis. The initial position describes a first functional position, while each further position of deflection from the initial position describes a further functional position.

The preferred embodiment, according to which a sensor for detecting the angular position between the first and the second ring element is provided, is particularly suitable for systems in which the input power is subjected to closed-loop control. The angle signal output by the sensor is used for this purpose.

The invention furthermore relates to an adjustment device for a hydrodynamic converter. The adjustment device has an actuator with ring elements that are arranged concentrically. The ring elements are arranged concentrically with respect to one another. A first ring element is adapted to be connected to at least one adjustable blade of the converter for the transmission of an actuating force or of an actuating torque by means of a deflection device. For the actuating motion of the adjustable blade, the first ring element can be turned relative to a second ring element in the circumferential direction of the two ring elements. For the other advantages of such an adjustment device, attention is drawn to the embodiment in connection with the hydrodynamic converter.

Illustrative embodiments of the adjustment device are described above in connection with the hydrodynamic converter. The adjustment device according to the claims is also disclosed and claimed independently of the hydrodynamic converter in connection with the embodiments specified in the claims, insofar as these relate to the adjustment device.

BRIEF DESCRIPTION OF THE SEVERAL VIEWS OF THE DRAWING

The invention is described in greater detail below together with further details with reference to the attached drawings, in which.

DESCRIPTION OF THE INVENTION

Figure 1:
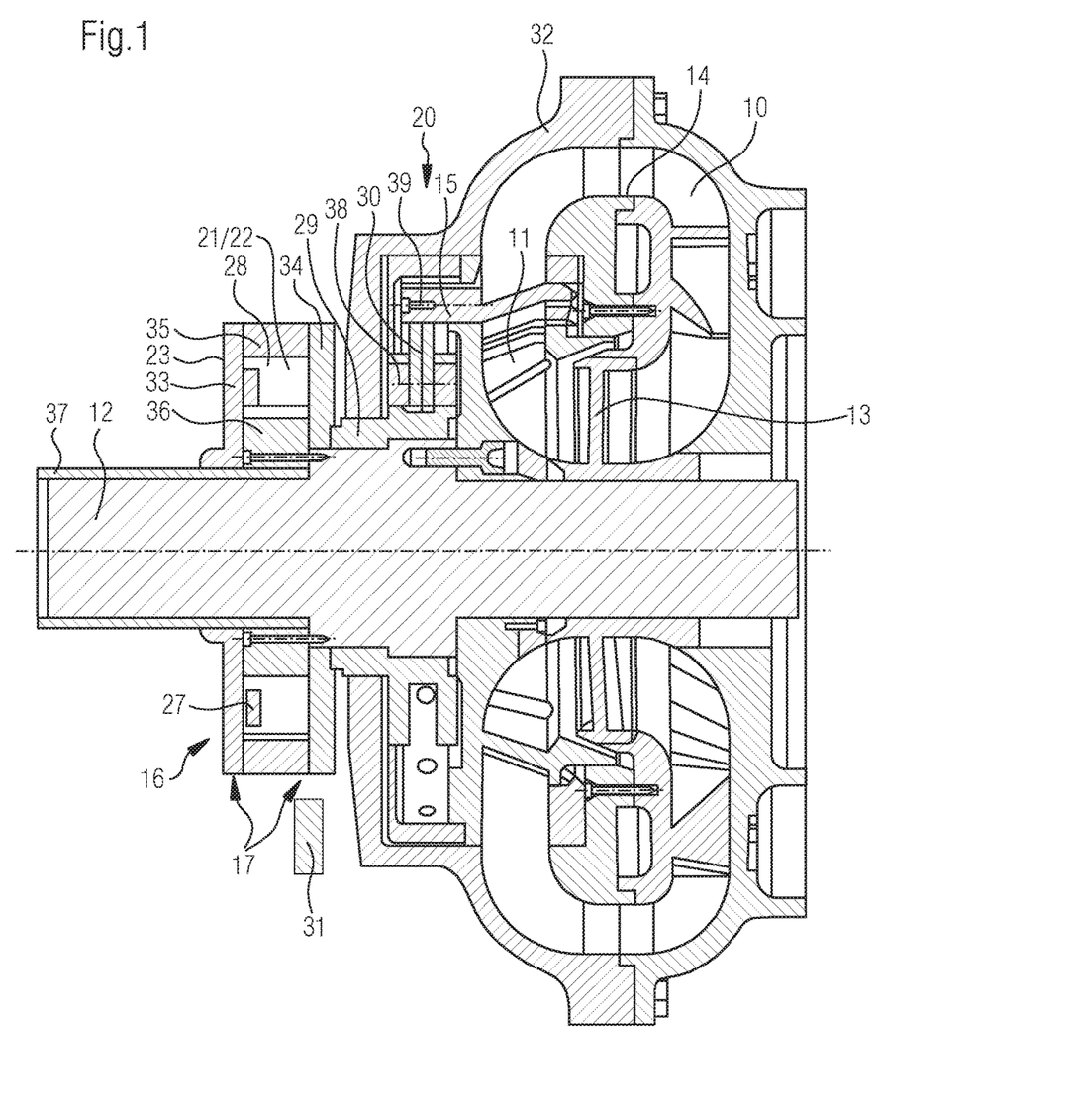
FIG. 1: shows a longitudinal section through a converter according to the invention along the drive shaft.

FIG. 1 shows a longitudinal section through a hydrodynamic converter according to an illustrative embodiment according to the invention. Converters of this kind are used in the control of pumps or compressors, for example, and can be coupled to mechanical gear units, e.g. planetary gear units. Different modes of use are conceivable here. Speed-controlled drives in a power range of from 1 to over 50 MW, for example, in the oil and gas industry and in thermal power plants are possible. The invention is not restricted to such modes of use but relates to hydrodynamic converters in general.

The converter shown by way of example in FIG. 1 is specifically a single-phase counterrotating converter having a pump wheel 11, a turbine wheel 13 and a stator 14. In the counterrotating converter shown, the pump wheel 11 and the turbine wheel 13 rotate in opposite directions. The stator 14 is connected in a fixed manner to the stator housing 32 (single-phase converter). In the illustrative embodiment according to FIG. 1, the stator 14 forms a reversing stator, which is arranged between the pump wheel 11 and the turbine wheel 13.

Figure 2:
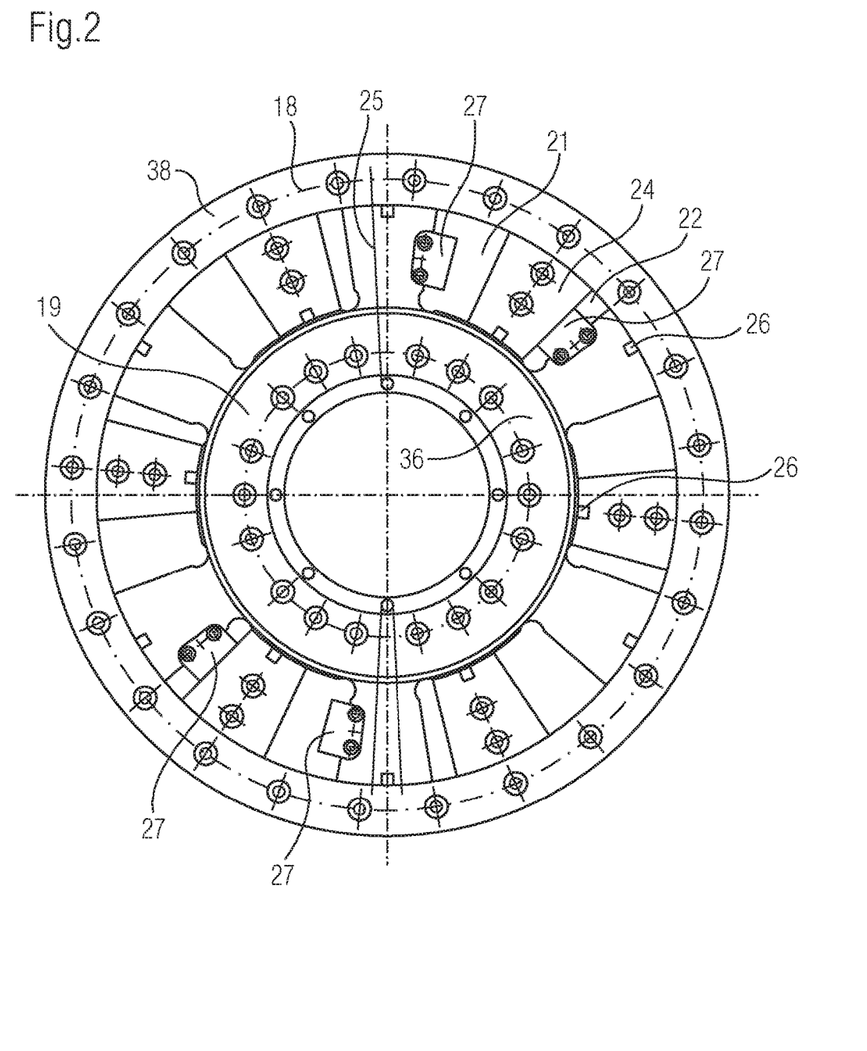
FIG. 2: shows a cross-section through the actuator of the converter according to FIG. 1.
Figure 3:
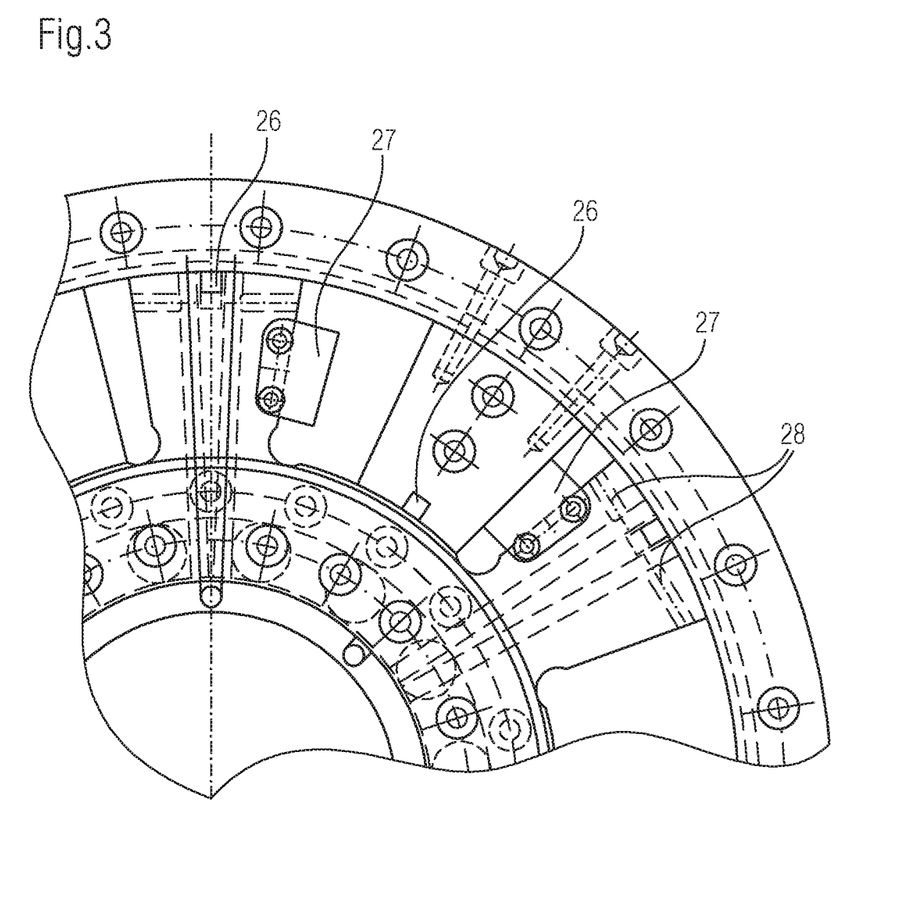
FIG. 3: shows a cutaway portion of the actuator according to FIG. 2.

The invention is not restricted to the counterrotating converter shown. All the features described with reference to FIGS. 1-3 are disclosed and claimed in connection with a hydrodynamic converter in general.

For example, multi-stage counterrotating converters can be designed in accordance with the invention. It is also possible to employ the invention with corotating converters, in which the pump wheel 11 and the turbine wheel 13 rotate in the same direction. It is also conceivable to employ the invention with multi-phase hydrodynamic converters, where, once again, single-stage or multi-stage designs are likewise possible.

To be specific, the converter shown in FIG. 1 has a working space 10, through which an operating medium can flow. The converter has a pump wheel 11, which is connected to a drive shaft 12, and a turbine wheel 13, which is connected to a driven shaft (not shown). The turbine wheel 13 is rotatably mounted on the drive shaft 12, for example. In the illustrative embodiment shown in FIG. 1, the stator housing 32 with the stator 14 is arranged in a fixed manner. Revolving stator housings 32 are possible. Together with the housing of the turbine wheel 13 and with the housing of the pump wheel 11, the stator housing 32 forms a working space 10 which is enclosed in the form of a shell and in which the flow circuit forms during operation.

The pump wheel 11 is connected for conjoint rotation to the drive shaft 12. For this purpose, a shaft shoulder is formed in the drive shaft 12, and the pump wheel 11 is screwed axially to said shoulder. Other shaft-hub connections are possible.

The pump wheel 11 has at least one adjustable blade 15. The other pump blades of the pump wheel 11 can likewise be designed in a corresponding manner as adjustable blades 15. As an alternative, the remaining pump blades can be of rigid design.

The adjustable blade 15 is assigned an adjustment device 16, which rotates with the pump wheel 11 during the operation of the converter. The adjustment device 16 has a deflection device 20 and an actuator 17. The deflection device 20 couples the actuator 17 to the adjustable blade 15.

The actuator 17 has ring elements 18, 19, which are each arranged coaxially with respect to the drive shaft 12, i.e. the two ring elements 18, 19 are also arranged concentrically (see also FIG. 2).

The first ring element 18 can be turned relative to the second ring element 19 in the circumferential direction of the drive shaft 12. The turning movements of the first ring element 18 actuate the deflection device 20, which transmits the turning motion of the ring element 18 to the adjustable blade 15 and changes the angle of attack of the adjustable blade 15.

To be specific, in the illustrative embodiment shown in FIG. 1 the second ring element 19 is arranged on the inside and connected for conjoint rotation to the drive shaft 12. This can be accomplished by screwing the second ring element 19 axially to a shaft shoulder of the drive shaft 12, for example. The second ring element 19 rotates with the drive shaft 12. The rotatably mounted first ring element 18 forms a cylindrical housing 23 which encloses the second ring element 19. In other words, the second ring element 19 is arranged in the housing 23 of the first ring element 18. For this purpose, the first ring element 18 has a first end wall 33, which is arranged on the outside in the axial direction, and a second end wall 34, which is arranged on the inside in the axial direction, said walls delimiting the housing 23 in the axial direction. The housing 23 has an outer ring 35, which delimits the housing 23 in the radial direction and is arranged between the two end walls 33, 34. The counterpart to the outer ring 35 is formed by the inner ring 36 of the second ring element 19, which is seated directly on the drive shaft 12 and is screwed to the shaft shoulder, as described above. As can be seen in FIG. 1, the two end walls 33, 34 fit over the inner ring 36 in such a way that an annular space is formed between the first and the second ring element 18, 19. The first end wall 33 forms a sealing surface with respect to the outer circumference of the drive shaft 12.

FIG. 2 shows a cross section through the two mounted ring elements 18, 19, from which the annular space and the internal fittings arranged therein can be seen. The two ring elements 18, 19 each have radially arranged vanes 24, 25, which act as rotary vanes by virtue of the relative rotation between the first and the second ring element 18, 19. To be specific, the first ring element 18 has first vanes 24, which are secured on the outer ring 35 and extend radially inward. The second ring element 19 has second vanes 25, which are formed on the inner ring 36 and extend radially outward. The vanes 24, 25 of the two ring elements 18, 19 are thus arranged mirror-image fashion.

Pressure chambers 21, 22, the volume of which can be varied by means of the position of the respective vane 24, 25, are formed between the vanes 24, 25 of the two ring elements 18, 19. In other words, the distance between the vanes 24, 25 in the circumferential direction can be varied by turning the first ring 18.

In each case one vane 24 of the first ring element 18 and a further vane 25 of the second ring element 19 together delimit a first pressure chamber 21. For this purpose, the first vane 24 of the first ring element 18 rests sealingly on the inner ring 36 of the second ring element 19. The same applies in a corresponding manner to the second vane 25 of the second ring element 19, which rests sealingly on the inner circumference of the outer ring 35 of the first ring element 18. The two vanes 24, 25 furthermore extend in the axial direction between the end walls 33, 34, on which the vanes 24, 25 likewise rest sealingly, with the result overall that a closed pressure chamber 21 is formed, which is delimited in the circumferential direction by the vanes 24, 25 and in the radial direction by the outer ring 35 and the inner ring 36.

In the circumferential direction of the two ring elements 18, 19, a further pressure chamber 22 is formed, which is delimited in a corresponding manner by the vanes 24, 25 of the two ring elements 18, 19.

In other words, a first vane 24 of the first ring element 18 is arranged between two second vanes 25 of the second ring element 19, with the result that a respective pressure space 21, 22 is formed on each side of the first vane 24.

As can be seen in FIG. 2, a plurality of pressure chambers 21, 22 is formed in a corresponding manner on the circumference of the two ring elements 18, 19, wherein in each case a first vane 24 of the first ring element 18 and a second vane 25 of the second ring element 19 are arranged alternately. As a result, pressure chambers 21, 22 arranged in a manner distributed over the circumference are formed, said chambers extending on both sides of the first vane 24 of the first ring element 18.

To produce the relative rotation between the two ring elements 18, 19, the pressure chambers 21, 22 can each be subjected to pressure. In the illustrative embodiment shown in FIG. 2, the pressure is produced hydraulically. In the operating state shown in FIG. 2, the pressure prevailing in the first pressure chamber 21 is higher than that in the second pressure chamber 22, with the result that the first vane 24 and hence ring element 18 is rotated clockwise. By changing the pressure ratios in the two pressure chambers 21, 22, adjustment of the first ring element 18 in the counterclockwise direction is possible.

The first ring element 18 thus acts as an annular piston.

To limit the stroke motion of the first ring element 18 in the circumferential direction, stops 27 are provided, against which the first vane 24 of the first ring element 18 strikes (see FIG. 2). The stops 27 can, for example, be designed as replaceable adjustment blocks which are screwed to the second vanes 25 of the second ring element 19 or secured in some other way.

As shown in FIG. 2, the stops 27 are arranged on both sides of a first vane 24 of the first ring element 18 in order to limit the adjusting movement in both circumferential directions. Moreover, further stops 27 are arranged in point symmetry on the opposite side of the first ring element 18. The stops 27 can be seen in longitudinal section in FIG. 1.

Further details of the actuator 17 can be seen in the detail view according to FIG. 3. Thus it can be seen from FIG. 3, for example, that bores 28 are formed in the second ring element 19, said bores serving as pressure channels for the supply of the hydraulic fluid. To be specific, the pressure channels are formed in the inner ring 36 and extend radially outward through the second vane 25. The bores 28 open into the respective pressure chambers 21, 22 in the region of the outside diameter of the pressure chambers 21, 22 (see also FIG. 1). In other words, the clearance at the outlet openings of the bores 28 with respect to the outer ring 35 is very much smaller than the clearance with respect to the inner ring 36.

As a result, a scavenging effect is achieved, by means of which accumulation of contaminants on the outer ring 35 is to a large extent prevented.

The feed channels which connect the bores 28 of the second ring element 19 to a feed device (not shown) are formed directly in the drive shaft 12 or in a component associated with the drive shaft 12. To be specific, a sleeve 37, in which the feed channels for supplying the pressure chambers 21, 22 with hydraulic fluid are formed, is arranged between the inner ring 36 of the second ring element 19 and the drive shaft 12. The connection between the inner ring 36 and the sleeve 37 can be made nonpositively, for example.

To transmit the rotary motion of the first ring element 18 to the adjustable blade 15, the deflection device 20 described below is provided. The deflection device 20 is connected for conjoint rotation to the first ring element 18. As a result, it is possible to introduce a torque into the deflection device 20, which is transmitted to the adjustable blade 15. Transmission by the deflection device 20 can be accomplished by a superimposed translational/rotary motion or by an exclusively rotary motion. The torque introduced by the first ring element 18 imparts a pivoting motion to the adjustable blade 15, as a result of which the angle of attack of the adjustable blade 15 is changed.

To be specific, the deflection device 20 has an adjusting ring 29 for this purpose, said ring being arranged coaxially. The adjusting ring 29 is seated on the outside diameter of the drive shaft 12 and can be rotated relative to the latter. The adjusting ring 29 is supported in the axial direction on the housing of the pump wheel 11, for example. The connection of the adjusting ring 29 for conjoint rotation to ring element 18 is made by means of the second end wall 34, arranged on the inside, of ring element 18, said wall being connected firmly to the adjusting ring 29. The connection can be made materially (welded joint) or positively or nonpositively, for example. The effect of the connection consists in taking the adjusting ring 29 along during a rotation of the first ring element 18. The adjusting ring 29 has a cam or driver on the end arranged axially on the inside, said driver interacting with a crank mechanism 30. The crank mechanism 30 is coupled to the adjustable blade 15. To be specific, the crank mechanism 30 has a lever element 31 or a push and pull rod, on the lower end of which a pin 38 is secured. The pivoting axis of the pin extends parallel to the central axis of the drive shaft 12. The upper end of the lever element 31 engages on the adjustable blade 15, specifically on an eccentrically arranged journal 39 of the adjustable blade 15, which projects axially from the housing of the pump wheel 11.

Together with the pin 38, the driver forms a pivot joint, about which the crank mechanism 30 can be pivoted. The pivoting motion takes place in the circumferential direction of the drive shaft 12. The driver acts as a sliding bearing in which the pin 38 is arranged with the ability for rotary motion.

The adjusting torque introduced by the adjusting ring 29 is transmitted to the crank mechanism 30 via the pin 38, which is supported in the driver of the adjusting ring 29. The crank mechanism 30 converts the rotary motion of the adjusting ring 29 into a superimposed translational/rotary motion of the crank mechanism 30, which brings about a tilting motion of the adjustable blade 15, thus allowing the desired angle of attack of the adjustable blade 15 to be set.

An alternative way of transmitting the rotary movements of the first ring element 18 to the adjustable blade 15 can be achieved by means of external toothing, which is formed on the axially inner end of the adjusting ring 29. To be specific, the axially inner end of the adjusting ring 29 can form a gearwheel or gearwheel segment, which meshes with corresponding external toothing on a journal of the adjustable blade 15. The journal extends parallel to the central axis of the adjusting ring 29. Other mechanical couplings of the adjusting ring 29 to the adjustable blade 15 are possible. The adjustable blade 15 can likewise form a pivoted blade, as shown in FIG. 1, which is pivoted as a whole. As an alternative, the blade 15 can be a multi-element blade 15 which has at least one adjustable pivoted segment.

As shown in FIG. 1, the converter has a sensor 40 for detecting the angular position between the first and the second ring element 18, 19. The sensor 40 allows closed-loop control of the input power of the pump wheel.

In summary, the converter according to FIG. 1 operates as follows:

To adjust the blading of the pump wheel 11, the actuator 17 is actuated. For this purpose, the pressure chambers 21, 22 are subjected to different pressures, with the result that the first ring element 18 is turned in the circumferential direction relative to the second ring element 19. By means of the rotary motion, the adjusting ring 29 is turned in the circumferential direction, thereby actuating the crank mechanism 30. The crank mechanism 30 converts the rotary motion of the adjusting ring 29 into a superimposed translational/rotary motion, which brings about a tilting motion of the adjustable blade, thus allowing the desired angle of attack of the adjustable blade 15 to be set. The position of the adjustable blade 15 is held by means of the pressure ratios in the actuator 17.

LIST OF REFERENCE SIGNS

- 10 working space
- 11 pump wheel
- 12 drive shaft
- 13 turbine wheel
- 14 stator
- 15 adjustable blade
- 16 adjustment device
- 17 actuator
- 18 first ring element
- 19 second ring element
- 20 deflection device
- 21 pressure chamber
- 22 pressure chamber
- 23 cylindrical housing
- 24 vane
- 25 vane
- 26 sealing elements
- 27 stops
- 28 bores
- 29 adjusting ring
- 30 crank mechanism
- 31 lever element
- 32 stator housing
- 33 first end wall
- 34 second end wall
- 35 outer ring
- 36 inner ring
- 37 sleeve
- 38 pin
- 39 journal
- 40 sensor

The invention claimed is:

1. A hydrodynamic converter, comprising:
   a working space, through which an operating medium can flow, a drive shaft and a pump wheel connected to said drive shaft;
a driven shaft and a turbine wheel connected to said driven shaft;
a stator;
at least one adjustable blade being a pump wheel blade; and
an adjustment device for adjusting said adjustable blade;
said adjustment device having an actuator with a plurality of ring elements disposed coaxially with respect to said drive shaft, wherein a first ring element of said plurality of ring elements is connected to said at least one adjustable blade at least indirectly by way of a deflection device for transmitting an actuating force or an actuating torque, and wherein said first ring element is rotatable relative to a second ring element of said plurality of ring elements in a circumferential direction of said drive shaft; and
wherein said first and second ring elements form at least two pressure chambers, which are arranged in the circumferential direction of the drive shaft and which can each be subjected to pressure for a relative rotation between said first and second ring elements.

2. The hydrodynamic converter according to claim 1, wherein said deflection device is formed by said actuator.

3. The hydrodynamic converter according to claim 1, wherein said second ring element is connected for conjoint rotation to said drive shaft and configured to take said first ring element along during a rotation of said drive shaft.

4. The hydrodynamic converter according to claim 1, wherein said first ring element forms a cylindrical housing, and said second ring element is arranged in said cylindrical housing.

5. The hydrodynamic converter according to claim 1, wherein each of said first and second ring elements has radially extending vanes arranged in mirror-image fashion and delimiting said pressure chambers in the circumferential direction.

6. The hydrodynamic converter according to claim 5, wherein said vanes have radially arranged sealing elements to seal off said pressure chambers.

7. The hydrodynamic converter according to claim 1, wherein said pressure chambers have stops for limiting a relative rotation between said first and second ring elements, said stops being arranged in the circumferential direction of said drive shaft.

8. The hydrodynamic converter according to claim 1, wherein at least one of said ring elements is formed with bores opening into said pressure chambers for an application of pressure.

9. The hydrodynamic converter according to claim 8, wherein said second ring element has said bores formed in a region of an outer diameter thereof.

10. The hydrodynamic converter according to claim 1, wherein said deflection device includes an adjusting ring, which is arranged coaxially with respect to said drive shaft and is connected for conjoint rotation to said first ring element, wherein said adjusting ring is coupled to said at least one adjustable blade for transmitting an actuating force or an actuating torque.

11. The hydrodynamic converter according to claim 1, wherein said adjustable blade comprises a pivoted blade or a multi-element blade having at least one pivoted segment.

12. The hydrodynamic converter according to claim 1, wherein said hydrodynamic converter is embodied as a counterrotating converter and the adjustment device is arranged outside said converter in the axial direction.

13. The hydrodynamic converter according to claim 12, wherein said adjustment device is arranged adjacent said pump wheel.

14. The hydrodynamic converter according to claim 1, which comprises a sensor for detecting an angular position between said first and second ring elements.

15. An adjustment device for a hydrodynamic converter, the hydrodynamic converter having a pump wheel connected to a drive shaft, the adjustment device comprising:
an actuator with concentrically arranged ring elements;
said ring elements including a first ring element to be connected to at least one adjustable blade of a pump wheel of the hydrodynamic converter for transmitting an actuating force or an actuating torque by way of a deflection device, and wherein said first ring element is rotatable relative to a second ring element in a circumferential direction thereof;
wherein said first and second ring elements form at least two pressure chambers, which are arranged in the circumferential direction of a drive shaft of the pump wheel and which can each be subjected to pressure for a relative rotation between said first and second ring elements.

16. A hydrodynamic converter assembly, comprising:
a counter-rotating hydrodynamic converter having a working space through which an operating medium can flow, a drive shaft and a pump wheel connected to said drive shaft, a driven shaft and a turbine wheel connected to said driven shaft, a stator and at least one adjustable blade;
an adjustment device for adjusting said at least one adjustable blade;
said adjustment device being arranged outside said converter in an axial direction and adjacent said pump wheel of said converter;
said adjustment device having an actuator with a plurality of ring elements disposed coaxially with respect to said drive shaft, wherein a first ring element of said plurality of ring elements is connected to said at least one adjustable blade at least indirectly by way of a deflection device for transmitting an actuating force or an actuating torque, and wherein said first ring element is rotatable relative to a second ring element of said plurality of ring elements in a circumferential direction of said drive shaft.

17. The hydrodynamic converter according to claim 16, wherein said deflection device includes an adjusting ring, which is arranged coaxially with respect to said drive shaft and is connected for conjoint rotation to said first ring element, wherein said adjusting ring is coupled to said at least one adjustable blade for transmitting an actuating force or an actuating torque.

18. The hydrodynamic converter according to claim 17, wherein the adjusting ring has at least one cam, which interacts with a crank mechanism that is coupled to said adjustable blade.

19. The hydrodynamic converter according to claim 18, wherein said adjustable blade comprises a pivoted blade or a multi-element blade having at least one pivoted segment.

20. The hydrodynamic converter according to claim 18, wherein said at least one cam interacts with a radially arranged lever element.

21. The hydrodynamic converter according to claim 20, wherein said adjusting ring is formed with external toothing configured to mesh with an external toothing of a journal of said adjustable blade, which extends parallel to a central axis of said adjusting ring.

22. The hydrodynamic converter according to claim 17, wherein said hydrodynamic converter is embodied as a counterrotating converter and the adjustment device is arranged outside said converter in the axial direction.

23. The hydrodynamic converter according to claim 16, which comprises a sensor for detecting an angular position between said first and second ring elements.

* * * * *